US012515213B2

(12) United States Patent
Van Rijen et al.

(10) Patent No.: US 12,515,213 B2
(45) Date of Patent: *Jan. 6, 2026

(54) MEMBRANES AND THEIR USES

(71) Applicants: Fujifilm Manufacturing Europe B.V., Tilburg (NL); Fujifilm Corporation, Tokyo (JP)

(72) Inventors: Adrianus Jacobus Van Rijen, Tilburg (NL); Elisa Huerta Martinez, Tilburg (NL)

(73) Assignees: Fujifilm Manufacturing Europe B.V., Tilburg (NL); Fujifilm Corporation, Tokyo (JP)

( * ) Notice: Subject to any disclaimer, the term of this patent is extended or adjusted under 35 U.S.C. 154(b) by 717 days.

This patent is subject to a terminal disclaimer.

(21) Appl. No.: 17/904,992

(22) PCT Filed: Apr. 1, 2021

(86) PCT No.: PCT/EP2021/058613
§ 371 (c)(1),
(2) Date: Aug. 25, 2022

(87) PCT Pub. No.: WO2021/198419
PCT Pub. Date: Oct. 7, 2021

(65) Prior Publication Data
US 2023/0107868 A1   Apr. 6, 2023

(30) Foreign Application Priority Data

Apr. 2, 2020 (GB) ..................................... 2004899

(51) Int. Cl.
| | |
|---|---|
| *C08J 5/22* | (2006.01) |
| *B01D 61/46* | (2006.01) |
| *B01D 61/50* | (2006.01) |
| *B01D 67/00* | (2006.01) |
| *B01D 69/02* | (2006.01) |
| *B01D 69/12* | (2006.01) |
| *B01D 71/28* | (2006.01) |
| *B01D 71/40* | (2006.01) |
| *B01J 39/04* | (2017.01) |
| *B01J 39/20* | (2006.01) |
| *B01J 41/04* | (2017.01) |
| *B01J 41/14* | (2006.01) |
| *B01J 47/12* | (2017.01) |

(52) U.S. Cl.
CPC ............ *B01J 47/12* (2013.01); *B01D 61/463* (2022.08); *B01D 61/50* (2013.01); *B01D 67/0006* (2013.01); *B01D 67/0095* (2013.01); *B01D 69/02* (2013.01); *B01D 69/125* (2013.01); *B01D 71/28* (2013.01); *B01D 71/281* (2022.08); *B01D 71/283* (2022.08); *B01D 71/401* (2022.08); *B01J 39/04* (2013.01); *B01J 39/20* (2013.01); *B01J 41/04* (2013.01); *B01J 41/14* (2013.01); *C08J 5/2231* (2013.01); *B01D 2323/21827* (2022.08); *B01D 2323/345* (2013.01); *B01D 2325/42* (2013.01); *C08J 2325/18* (2013.01); *C08J 2333/24* (2013.01); *C08J 2335/06* (2013.01); *C08J 2339/08* (2013.01); *C08J 2341/00* (2013.01)

(58) Field of Classification Search
USPC .......................................................... 521/27
See application file for complete search history.

(56) References Cited

U.S. PATENT DOCUMENTS

| | | | |
|---|---|---|---|
| 7,901,831 B2 | 3/2011 | Brunea | |
| 2007/0111072 A1 | 5/2007 | Wayne et al. | |
| 2016/0310901 A1 | 10/2016 | Ramanan et al. | |
| 2017/0136413 A1* | 5/2017 | Choi ................... | H01M 8/1062 |
| 2023/0138382 A1* | 5/2023 | Van Rijen ................ | C08F 2/50 |
| | | | 521/27 |

FOREIGN PATENT DOCUMENTS

| | | |
|---|---|---|
| CN | 109231377 A | 1/2019 |
| WO | 2018080834 A1 | 5/2018 |

OTHER PUBLICATIONS

Walsh, Zarah. "Exotic Monoliths" Thesis, 2018.
Gopidas et al. "Photochemistry In Polymers. Photoinduced Electron Transfer between Phenosafranine and Triethylamine In Perfluorosulfonate Membrane" J. Phys. Chem., 94, 11 (1990), 4723-4727.
Xu et al. "Formulation and characterization of a novel fluoride-releasing dental composite" Dental Meterials, 22, 11 (2006), 1014-1023.
Neumann et al. "Molar extinction coefficients and the photon; absorption efficiency of dental photoinitiators and; light curing units" Journal of Dentistry, 33 (2005), 525-532.
Kozaderova. "Electrochemical Characterization of an MB-2 Bipolar Membrane Modified by Nanosized Chromium (III) Hydroxide" Nanotechnologies in Russia, 13, 9, (2019), 508-515.
Cerar, Janez. "Reaction between Chromium(III) and EDTA Ions:; an Overlooked Mechanism of Case Study Reaction; of Chemical Kinetics" Acta Chimica Slovenica, 62 (2015), 538-545.

* cited by examiner

*Primary Examiner* — Fred M Teskin
(74) *Attorney, Agent, or Firm* — Banner & Witcoff, Ltd.

(57) ABSTRACT

Ion exchange membranes obtainable by curing a composition comprising:
(a) a monomer comprising an aromatic group and at least one polymerisable ethylenically unsaturated group;
(b) a photoinitiator which has an absorption maximum at a wavelength longer than 380 nm when measured in one or more of the following solvents at a temperature of 23° C.: water, ethanol and toluene; and
(c) at least one co-initiator.

25 Claims, No Drawings

MEMBRANES AND THEIR USES

RELATED APPLICATIONS

This application is a National Stage Application under 35 U.S.C. 371 of co-pending PCT application PCT/EP2021/058613 designating the United States and filed Apr. 1, 2021; which claims the benefit of GB application number 2004899.7 and filed Apr. 2, 2020, each of which are hereby incorporated by reference in their entireties.

TECHNICAL FIELD

This invention relates to ion exchange membranes and to processes for their preparation and use.

DESCRIPTION OF THE RELATED ART

Ion exchange membranes may be used in electrodialysis, reverse electrodialysis, electrolysis, diffusion dialysis and a number of other processes. Typically the transport of ions through the membranes occurs under the influence of a driving force such as an ion concentration gradient or, alternatively, an electrical potential gradient.

Ion exchange membranes are generally categorized as cation exchange membranes or anion exchange membranes, depending on their predominant charge. Cation exchange membranes comprise negatively charged groups that allow the passage of cations but reject anions, while anion exchange membranes comprise positively charged groups that allow the passage of anions but reject cations.

Ion exchange membranes may be produced by polymerizing curable monomers using an energy source, e.g. electron beam (EB) irradiation, ultraviolet (UV) irradiation or heat. Heat curing is a thermal polymerization process and is generally very slow. EB curing does not require initiators but instead requires expensive equipment. UV curing is a fast and efficient process that requires high power UV irradiation and a photoinitiator.

WO2017009602 ('602) describes the preparation of ion exchange membranes from simple aliphatic monomers using thermal and Type I photoinitiators.

When the monomers used to make ion exchange membranes are all aliphatic and/or simple aromatic monomers (e.g. as in '602) a UV curing step for forming the ion exchange membrane generally is quite effective. However when one or more of the monomers used to make an ion exchange membrane absorb significantly in the UV region (e.g. up to 380 nm or even higher) the absorption of UV light by the monomers can significantly interfere with the curing process. In such cases very high doses of UV light and/or high concentrations of photoinitiators are required to achieve the formation of sufficient number of radicals to accomplish the desired polymerization rate. The use of a high concentration of photoinitiators is undesirable for a number of reasons. For example, it is more expensive to use a high concentration of photoinitiators than a low concentration of photoinitiators. Membranes made from curing compositions containing a high concentration of photoinitiator(s) are often considered to be unsuitable for use in food and pharmaceutical applications due to potential toxicity fears and often require extra processing to reduce the chances of unacceptable levels of photoinitiator leaching-out from the membrane and into the food or pharmaceutical product. Furthermore, a high dose of UV light generates a lot of heat which requires cooling and increases the risk of burning the membrane or any support or carrier which is present during the curing process. Also high energy costs are involved.

Ion exchange membranes may also comprise a porous support in addition to an ionic polymer. The porous support provides mechanical strength and pores present within the support contain a polymer derived from curing a curable composition comprising ionic monomers. A problem with porous supports derived from aromatic compounds is that they can absorb the light intended for curing ionic monomers present in the curable composition. This problem means that many porous supports derived from aromatic compounds are unsuitable for the preparation of ion exchange membranes by curing with UV light.

In order to overcome the problem of porous supports derived from aromatic compounds absorbing the light needed to cure monomers, thermal curing methods have been used to prepare membranes comprising such supports. However thermal curing methods are generally slow.

In view of the foregoing, there is a need for a process for making ion exchange membranes from aromatic monomers which is quick and avoids the need for large amounts of photoinitiator. Furthermore, it is desirable for the ion exchange membrane to have good selectivity, low electrical resistance and high robustness.

SUMMARY OF THE INVENTION

According to a first aspect of the present invention there is provided an ion exchange membrane obtainable by curing a composition comprising:
  (a) a monomer comprising an aromatic group and at least one polymerisable ethylenically unsaturated group;
  (b) a photoinitiator which has an absorption maximum at a wavelength longer than 380 nm when measured in one or more of the following solvents at a temperature of 23° C.: water, ethanol and toluene; and
  (c) at least one co-initiator.

DETAILED DESCRIPTION

In this document (including its claims), the verb "comprise" and its conjugations is used in its non-limiting sense to mean that items following the word are included, but items not specifically mentioned are not excluded. In addition, reference to an element by the indefinite article "a" or "an" does not exclude the possibility that more than one of the elements is present, unless the context clearly requires that there be one and only one of the elements. The indefinite article "a" or "an" thus usually mean "at least one". The term 'ion exchange membrane' is often abbreviated herein to 'membrane'.

The membranes of the present invention are preferably in the form of a sheet or hollow fibres and they are particularly useful for preparing ion exchange materials e.g. ion exchange membranes.

Preferably component (b) is a Norrish Type II photoinitiator.

'602 describes the use of thermal and Type I photoinitiators but not the use of the photoinitiators defined in component (b) of the present invention.

The ion exchange membrane is preferably a cation exchange membrane (i.e. comprising anionic groups, also known as a CEM), an anion exchange membrane (i.e. comprising cationic groups, also known as an AEM (depending on its predominant charge) or a bipolar membrane. As mentioned above, cation exchange membranes comprise negatively charged groups that allow the passage of cations but reject anions, while anion exchange membranes comprise positively charged groups that allow the passage of anions but reject cations. Bipolar membranes typically comprise a layer of cationic membrane adjacent to a layer of anionic membrane.

In one embodiment the at least one polymerisable ethylenically unsaturated group of component (a) is provided by a vinyl group, for example the aromatic group and the at least one polymerisable ethylenically unsaturated group of component (a) are provided by a vinylaryl group.

In another embodiment the at least one polymerisable ethylenically unsaturated group of component (a) is provided by a (meth)acrylic group (e.g. a. (meth)acrylate or (meth)acrylamide group).

Vinylaryl groups are of the formula Ar—CH═CH— wherein Ar is an aryl group. Examples of aryl groups include optionally substituted (e.g. 0 to 3 substituents) phenyl, napthyl, pyridyl, thiazinyl, triazinyl, thiophenyl, indolinyl, isoindolinyl, indolizinyl, isoquinolinyl, dibenzofuranyl, xanthenyl, furanyl, pyrryl and pyrimidinyl groups. The optional substituents are preferably each independently selected from carboxyl, sulphonyl, amine, amide, sulphonamide, sulphonimide, ammonium, hydroxyl, halo, nitro, $C_{1-4}$-alkyl, $C_{1-4}$-alkoxy and phenyl.

In one embodiment component (a) comprises at least one vinylaryl group, for example a vinylphenyl group, a vinylpyridyl group, a vinylimidazyl group, a vinylthiazinyl group, a vinyltriazinyl group, a vinylpyrryl group and/or a vinylpyrimidyl group.

Examples of commercially available compounds comprising at least one vinylaryl group include 4-vinylbenzyl chloride, 4-vinylbenzyl bromide, 4-vinylaniline, 4-vinylanisole, methylstyrene, dimethylstyrene, trimethylstyrene, 4-vinylbenzoic acid, (vinylbenzyl)trimethylammonium chloride, N,N-dimethylvinylbenzylamine, 4-ethoxystyrene and 3,4-dimethoxystyrene.

Preferred groups comprising an aromatic group and a (meth)acrylic group are of the Formula (1):

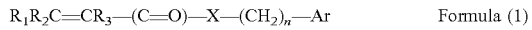

$$R_1R_2C=CR_3-(C=O)-X-(CH_2)_n-Ar \qquad \text{Formula (1)}$$

wherein:
Ar is an aromatic group;
$R_1$, $R_2$ and $R_3$ are each independently H, optionally substituted alkyl or optionally substituted aryl; or
one of $R_1$ or $R_2$ forms a ring together with $R_3$ and the C═C group shown in Formula (1) and the other of $R_1$ or $R_2$ is H, optionally substituted alkyl or optionally substituted aryl;
X is —O— or —N(—) $R_4$ wherein with $R_4$ is H or optionally substituted alkyl, aryl or alkylaryl; and
n has a value of from 1 to 10.

Preferred aromatic groups represented by Ar include optionally substituted phenyl, optionally substituted naphthyl, optionally substituted anthracyl, optionally substituted phenanthryl groups, and optionally substituted hetero-aromatic groups such as pyrryl, pyrazolyl, triazinyl, thiazinyl, oxazinyl, pyranyl, and thiapyranyl groups.

Preferred alkyl groups represented by $R_1$, $R_2$, $R_3$ and $R_4$ include optionally substituted $C_{1-4}$-alkyl.

The optional substituents which may be present on the aforementioned alkyl groups include hydroxyl, carboxy, sulphoxy, amino, amine, cyano, ether, thioether and optionally substituted aryl groups.

The optional substituents which may be present on the aforementioned aryl groups include hydroxyl, carboxy, sulphoxy, amino, amine, cyano, ether and thioether and $C_{1-4}$-alkyl groups.

The ring which may be formed by one of $R_1$ or $R_2$ together with $R_3$ and the C═C group shown in Formula (1) is preferably a 5-membered ring, for example a maleimide or maleic anhydride ring.

Preferably n has a value of 1 to 6, more preferably 1, 2, 3 or 4.

Preferably the composition comprises 2 to 95 wt %, more preferably 20 to 95 wt %, especially 30 to 75 wt % of component (a). In some embodiments the composition preferably comprises 2 to 10 wt %, more preferably 2 to 6 wt %, e.g. 2 to 4 wt %, of component (a).

In one embodiment the composition further comprises (d) one or more curable monomers which are free from aromatic groups. Preferably component (d) comprises at least one anionic or cationic group.

The preferred anionic group(s) which may be present in component (d) include acidic groups, for example a sulpho, carboxy and/or phosphato groups, especially sulpho groups.

Preferred cationic group(s) which may be present in component (d) include quaternary ammonium and phosphonium groups, especially quaternary ammonium groups.

Preferably component (d) is not polymeric, but monomeric or oligomeric.

Preferably component (d) has a molecular weight (MW) which satisfies the equation:

$$MW<(3000+300n)$$

wherein:
MW is the molecular weight of component (d); and
n has a value of 1, 2, 3 or 4 and is the number of ionic groups present in component (d).

In the above equation, for some embodiments MW is more preferably <(250+250n), even more preferably <(200+200n), especially <(150+200n), wherein MW 10 and n are as hereinbefore defined.

Component (d) preferably comprises an anionic group or a cationic group and one or more ethylenically unsaturated groups, e.g. polymerisable ethylenically unsaturated groups. Component (d) may comprise several different compounds.

Depending on the pH of the composition, the anionic or cationic groups present in component (d) may partially or wholly form a salt with a counter-ion, e.g. sodium, lithium, ammonium, potassium and/or pyridinium for anionic groups and chloride and/or bromide for cationic groups.

The preferred ethylenically unsaturated groups which may be present in component (a) and (d) (when present) are vinyl groups, e.g. in the form of (meth)acrylic, allylic or styrenic groups. The (meth)acrylic groups are preferably (meth)acrylate or (meth)acrylamide groups, more preferably acrylic groups, e.g. acrylate or acrylamide groups.

Examples of curable monomers comprising at least one polymerisable ethylenically unsaturated group and an aromatic group which may be used as component (a) include compounds according to formula $M^{-1}$ to M-55, compounds according to Formula (CL) and according to Formula (SM), and mixtures comprising two or more thereof.

Examples of curable monomers comprising at least one aromatic group and a (meth)acrylic group are shown in formulae $M^{-1}$ to M-42, and mixtures comprising two or more thereof.

Examples of curable monomers comprising at least one vinylaryl group include (vinylbenzyl)trimethylammonium chloride, quaternized vinylimidazole, compounds according to formula M-43 to M-56 shown below and the compounds shown in Formulae (CL) and (SM) below, and mixtures comprising two or more thereof (in M-45, the letter M signifies 2 atoms selected from Na+ and Li+ and mixtures thereof).
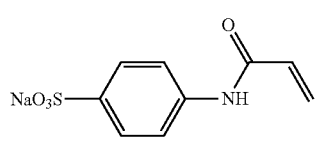
M-1
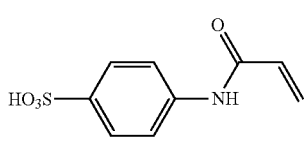
M-2
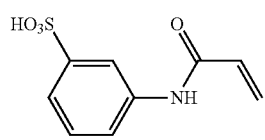
M-3
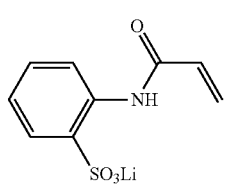
M-4
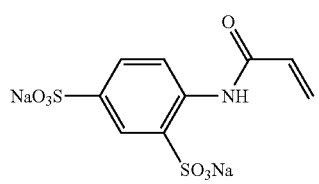
M-5
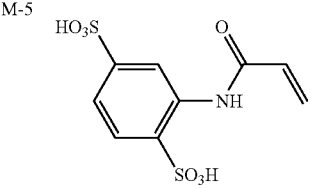
M-6
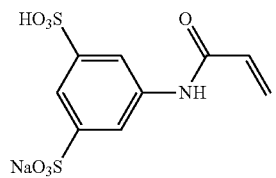
M-7
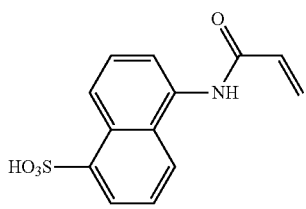
M-8
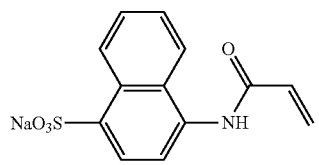
M-9
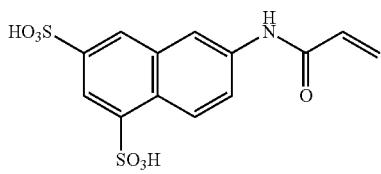
M-10
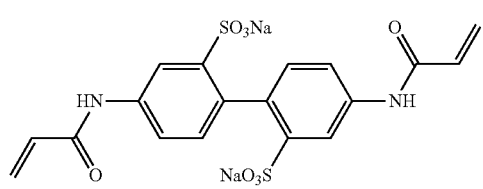
M-11
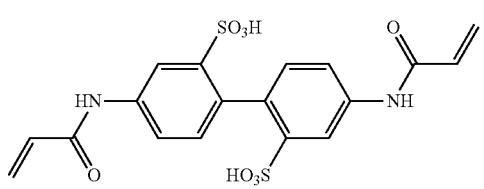
M-12
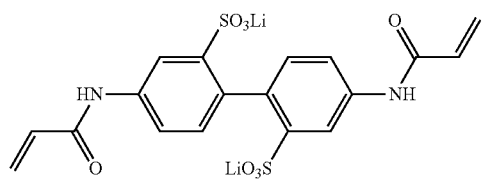
M-13
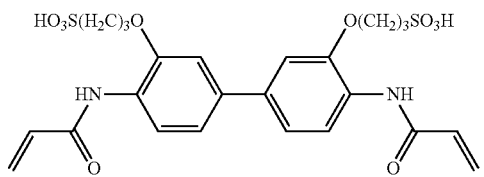
M-14

-continued
M-15
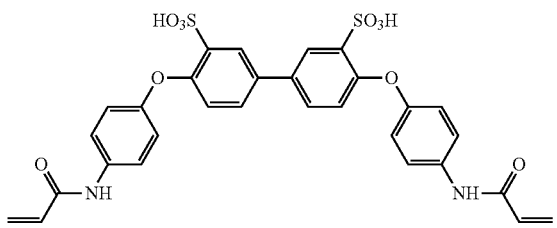
M-16
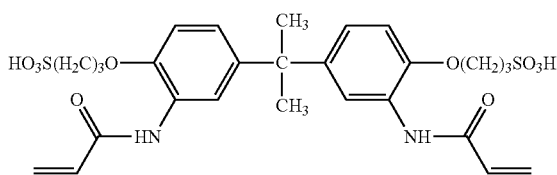
M-17
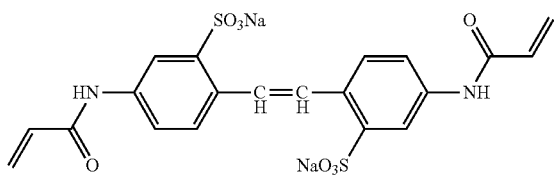
M-18
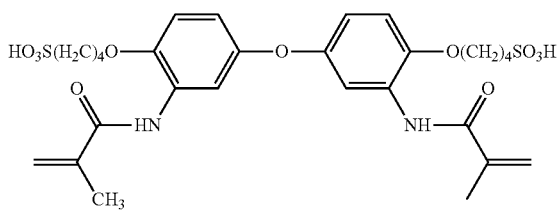
M-19
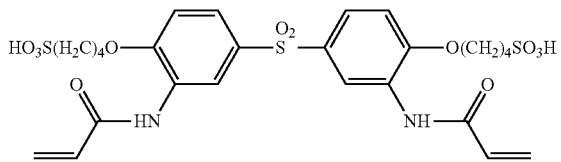
M-20
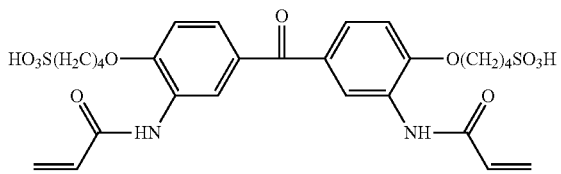
M-21
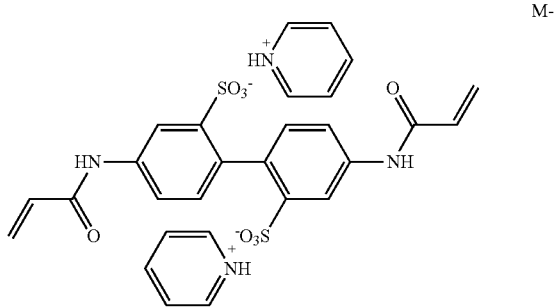
M-22
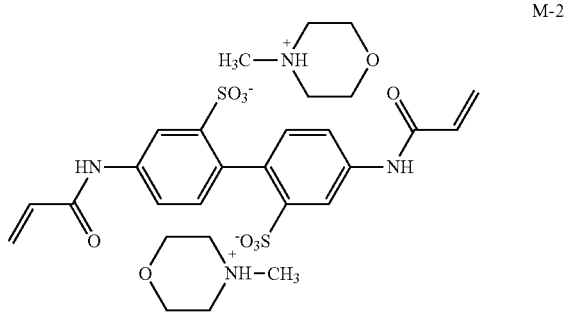
M-23
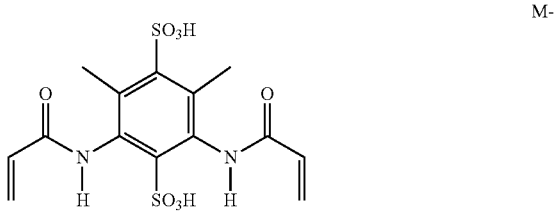
M-24
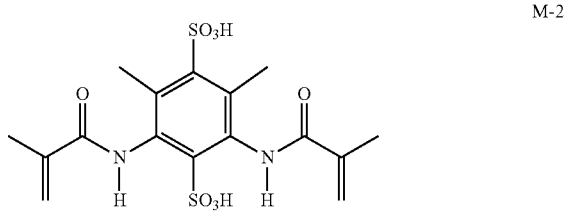
M-25
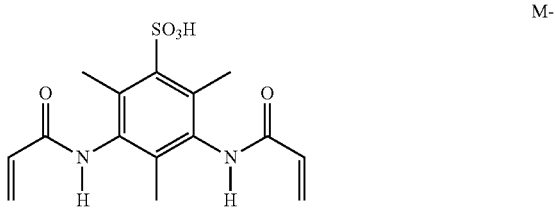
M-26
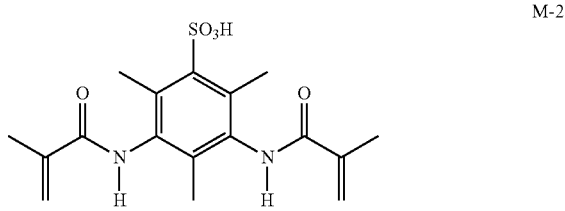
M-27
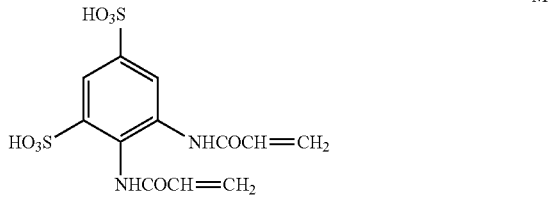
M-28
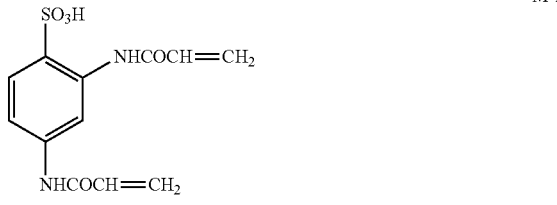

-continued
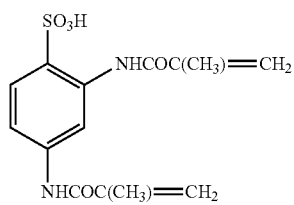 M-29
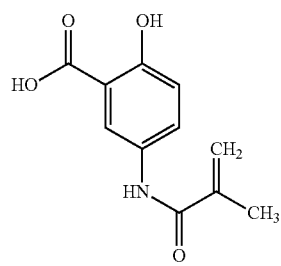 M-30
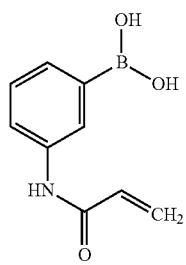 M-31
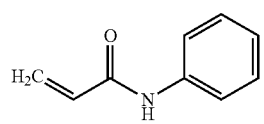 M-32
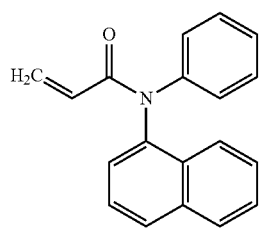 M-33
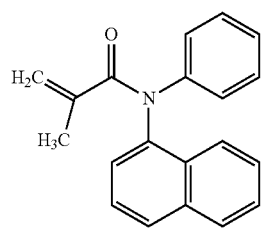 M-34
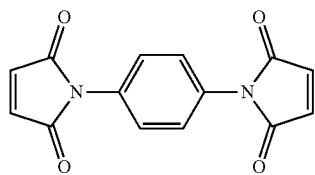 M-35
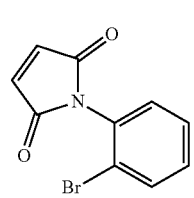 M-36
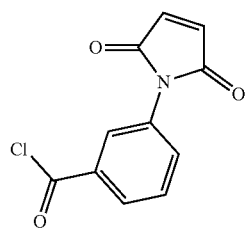 M-37
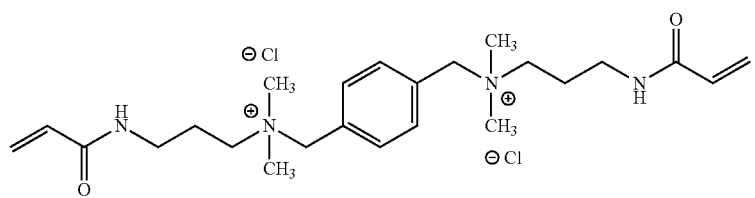 M-38
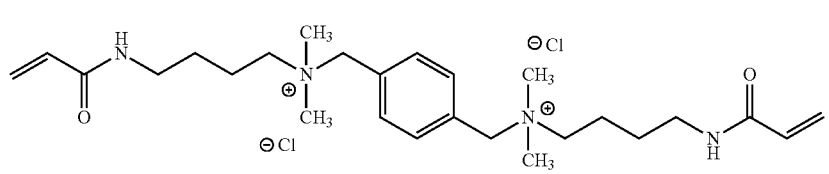 M-39

-continued
M-40
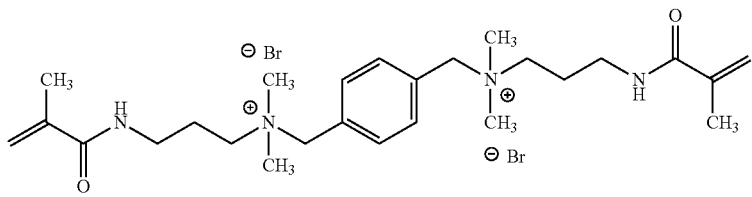
M-41
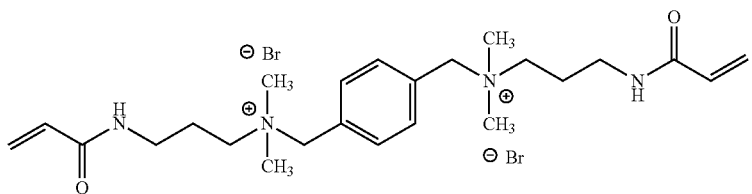
M-42
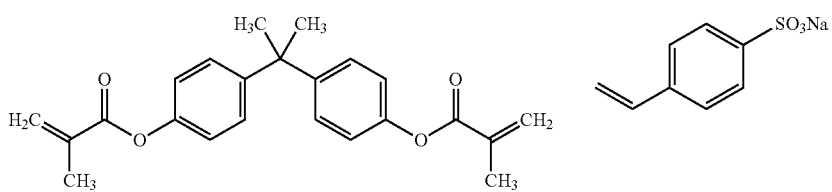
M-43
M-44
M-45
M-46
M-47
M-48
M-49
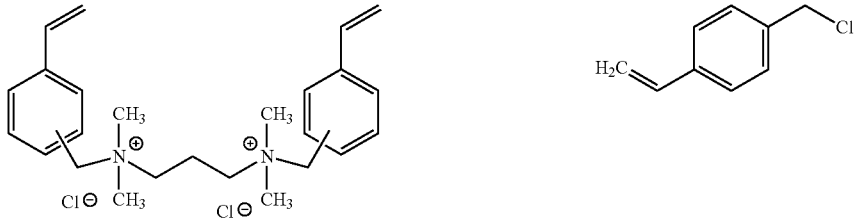
M-50
M-51

-continued

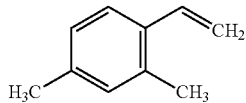
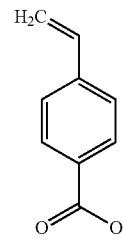
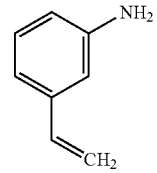
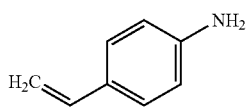
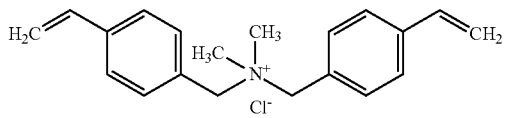
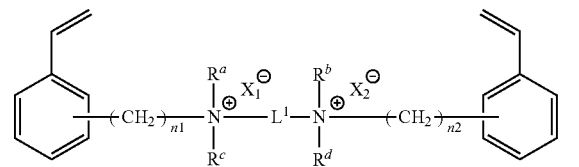
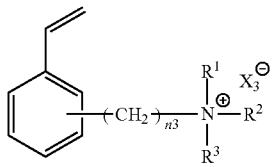

In Formula (CL):
  $L^1$ represents an alkylene group or an alkenylene group;
  $R^a$, $R^b$, $R^c$ and $R^d$ are each independently optionally substituted alkyl or optionally substituted aryl; or
  $R^a$ and $R^b$ and/or $R^c$ and $R^d$ form a ring together with the N-$L^1$-N group shown in Formula (CL);
  n1 and n2 each independently have a value of from 1 to 10; and
  $X_{1-}$ and $X_{2-}$ each independently represent an organic or inorganic anion.

In Formula (SM):
  $R_1$, $R_2$ and $R_3$ are each independently optionally substituted alkyl or optionally substituted aryl; or
  $R_1$ and $R_2$, or $R_1$, $R_2$, and $R_3$ form a ring together with the N atom shown in Formula (SM);
  n3 has a value of from 1 to 10; and
  $X_{3-}$ represents an organic or inorganic anion.

Preferred curable monomers comprising at least one cationic group and which are free from aromatic groups which may be used as component (d) comprise a quaternary ammonium group. Examples of such monomers include (3-acrylamidopropyl)trimethylammonium chloride, 3-methacrylamidopropyl trimethyl ammonium chloride, (2-(methacryloyloxy)ethyl) trimethylammonium chloride, [3-(methacryloylamino) propyl] trimethyl ammonium chloride, (2-acrylamido-2-methylpropyl)trimethylammonium chloride, 3-acrylamido-3-methylbutyl trimethyl ammonium chloride, acryloylamino-2-hydroxypropyl trimethyl ammonium chloride, N-(2-aminoethyl) acrylamide trimethyl ammonium chloride, and mixtures comprising two or more thereof.

Examples of curable monomers comprising at least one anionic group and which are free from aromatic groups which may be used as component (d) include acrylic acid, beta carboxy ethyl acrylate, maleic acid, maleic acid anhydride, vinyl sulphonic acid, phosphonomethylated acrylamide, (2-carboxyethyl) acrylamide, 2-(meth)acrylamido-2-methylpropanesulfonic acid.

Preferably the composition comprises 0 to 50 wt %, more preferably 0 to 30 wt %, of component (d). In some embodiments the composition preferably comprises 2 to 10 wt %, more preferably 2 to 6 wt %, e.g. 2 to 4 wt %, of component (d).

Component (d) optionally consists of one or more than one (e.g. 2 to 5) curable monomers, each having at least one anionic or cationic group.

Preferably component (d) has 1 to 5, more preferably 1 or 2 anionic or cationic group(s).

Although generally not preferable, the curable composition may comprise one or more non-ionic monomers as part of component (d) i.e. a monomer which is free from anionic and cationic groups and free from aromatic groups, typically in low amounts for specific purposes. Examples of non-ionic monomers include, e.g. hydroxyethylmethacrylate and methyl methacrylate, and non-ionic crosslinkers, e.g. as poly(ethylene glycol) diacrylate, tricyclodecane dimethanol diacrylate, neopentyl glycol ethoxylate diacrylate, propanediol ethoxylate diacrylate, butanediol ethoxylate diacrylate, hexanediol diacrylate, hexanediol ethoxylate diacrylate, poly(ethylene glycol-co-propylene glycol) diacrylate, poly (ethylene glycol)-block-poly(propylene glycol)-block-poly (ethylene glycol) diacrylate, isophorone diacrylamide, N,N'-(1,2-dihydroxyethylene)bis-acrylamide, N,N-methylenebis-acrylamide, N,N'-ethylenebis(acrylamide), bis (aminopropyl)methylamine diacrylamide, tricyclodecane dimethanol diacrylate, 1,4-diacryoyl piperazine, 1,4-bis (acryloyl) homopiperazine, glycerol ethoxylate triacrylate, trimethylolpropane ethoxylate triacrylate, trimethylolpropane ethoxylate triacrylate, pentaerythrytol ethoxylate tetraacrylate, ditrimethylolpropane ethoxylate tetraacrylate, dipentaerythrytol ethoxylate hexaacrylate, 1,3,5-triacryloylhexahydro-1,3,5-triazine, 2,4,6-triallyloxy-1,3,5-triazine, and combinations comprising two or more thereof.

Preferably the composition comprises 0 to 50 wt % of curable monomers which are free from anionic and cationic groups and free from aromatic groups, more preferably 0 to 30 wt %. In one embodiment the composition is free from curable monomers which are free from anionic and cationic groups.

The photoinitiator is preferably a Norrish Type II photoinitiator. Typically Norrish Type II photoinitiators are compounds that upon irradiation with light of an appropriate wavelength and intensity reaches an excited (triplet) state, the energy of which is transferred to a co-initiator by abstracting an electron or hydrogen atom therefrom causing the co-initiator to form a reactive radical species. The reactivity of Norrish Type II photoinitiators (i.e. cure speed) can be assessed using a Mettler Toledo DSC822e Differential Scanning calorimeter (DSC) as described in the experimental section below.

The photoinitiator preferably has an absorption maximum (i.e. at least one) at a wavelength between 385 and 800 nm, more preferably between 400 and 800, e.g. between 430 nm and 800 nm, when measured at a temperature of 23° C. in one or more of the following solvents: water, ethanol and toluene. The absorption maxima are preferably measured using a 0.01 wt % concentration of the photoinitiator dissolved in the relevant solvent (i.e. water, ethanol or toluene) at 23° C., e.g. using a 1 mm path length (e.g. a quartz cuvette having an internal length through which light passes of 1 mm). One may measure the absorption maximum using, for example, a Varian Cary 100 conc. double beam UV/VIS spectrophotometer.

Most photoinitiators are soluble at a temperature of 23° C. in at least one of water, ethanol and toluene. However in the event that a photoinitiator is found that is not soluble in any of these, one or two drops of a better solvent may be added (e.g. dimethylsulphoxide) in order to achieve a complete solution.

Many suitable photoinitiators useful as component (b) comprise polar groups (e.g. amine groups, carbonyl groups, hydroxyl groups) and are soluble in ethanol. Photoinitiators that comprise ionic groups usually have good solubility in water. Photoinitiators that comprise fused aromatic rings generally have low or no solubility in water and ethanol and good solubility in toluene. For some photoinitiators a mixture of solvents may be preferred. Thus the absorption maximum of component (b) may be measured at 23° C. and generally one will choose a solvent selected from water, ethanol, toluene, and mixtures thereof in which component (b) is soluble.

The molar attenuation coefficient at the absorption maximum (i.e. longer than 380 nm) of the photoinitiator (b) is preferably at least 7,500 $M^{-1}$ $cm^{-1}$ (750 $m^2$ $mol^{-1}$), more preferably at least 10,000 $M^{-1}$ $cm^{-1}$. The molar attenuation coefficient may be measured using an UV-VIS spectrophotometer, e.g. a Cary™ 100 UV-visible spectrophotometer from Agilent Technologies.

Optionally component (b) has an absorption maximum at a wavelength of 380 nm or shorter, provided that it also has an absorption maximum at a wavelength longer than 380 nm (in each case when measured in one or more of the following solvents at a temperature of 23° C.: water, ethanol and toluene).

Preferably the composition is such that the ratio of the attenuation coefficient of the composition containing component (b) to the attenuation coefficient of the same composition but with component (b) omitted, when measured at the wavelength where component (b) has a maximum absorption (or at a wavelength where the irradiation source has significant emission), is more than 1, more preferably more than 1.5, especially more than 2. This ratio is an indication for the absorption capability of component (b) in the composition itself and thus forms a useful parameter defining the properties of a preferred photoinitiator for component (b). In the case that this ratio is equal to 1 the other components in the composition absorb much or all of the light intended to cause curing of the composition and this can render the photoinitiator ineffective.

Thus preferably the composition satisfies Equation 1:

$$(A1/A2) > 1.5 \qquad \text{Equation 1}$$

wherein:
  A1 is the attenuation coefficient of the composition at wavelength X nm;
  A2 is the attenuation coefficient at wavelength X nm of a composition identical to the composition except that component (b) is omitted; and
  X nm is the wavelength of the absorption maximum of component (b);
wherein the attenuation coefficients are all measured at a temperature of 23° C.

Preferably (A1/A2)>2.

In Equation 1 the attenuation coefficients are preferably measured at 23° C., e.g. using a 1 mm path length (e.g. using a quartz cuvette having an internal length through which light passes of 1 mm).

Component (b) preferably comprises a xanthene, flavin, curcumin, porphyrin, anthraquinone, phenoxazine, camphorquinone, phenazine, acridine, phenothiazine, xanthone, thioxanthone, thioxanthene, acridone, flavone, coumarin, fluorenone, quinoline, quinolone, naphtaquinone, quinolinone, arylmethane, azo, benzophenone, carotenoid, cyanine, phtalocyanine, dipyrrin, squarine, stilbene, styryl, triazine or anthocyanin-derived photoinitiator, in each case provided that it has an absorption maximum at a wavelength longer than 380 nm, when measured in one or more of the following solvents at a temperature of 23° C.: water, ethanol and toluene, or a mixture comprising two or more thereof (e.g. from 2 to 5 of such photoinitiators). More preferably component (b) comprises a xanthene, flavin, curcumin, porphyrin, anthraquinone, phenoxazine, phenazine, acridine, phenothiazine, thioxanthene, acridone, flavone, coumarin, fluorenone, quinoline, quinolone, naphtaquinone, quinolinone, arylmethane, azo, carotenoid, cyanine, phtalocyanine, dipyrrin, squarine, styryl, triazine or anthocyanin derived photoinitiator, in each case provided that it has an absorption maximum at a wavelength longer than 380 nm, when measured in one or more of the following solvents at a temperature of 23° C.: water, ethanol and toluene.

Examples of photoinitiators having the absorption maximum specified above include eosin Y, eosin Y disodium salt, fluorescein, uranine, erythrosine B, rose bengal, phloxine B, 4,5-dibromofluorescein, rhodamine B, riboflavin, flavin mononucleotide, acriflavin, curcumin, resazurin, safranin O, phenosafranin, neutral red, acridine orange, acid blue 43, 1,4-diamino-anthraquinone, 1,4-dihydroxy-anthraquinone, bromaminic acid sodium salt, carminic acid, ethyl violet, patent blue V, methyl orange, naphtol yellow S, methylene blue, indigo carmine, (4-dimethylaminostyryl)methylpyridinium iodide, quinoline yellow, quinoline yellow WS, thionine acetate, beta-carotene, coumarin 6, coumarin 343, coumarin 153, zinc-protoporphyrin IX, zinc-tetraphenylporphyrin tetrasulfonic acid, zinc-phtalocyanine, cyanidin chloride, indomonocarbocyanine sodium, resorufin, nile red, pyronin Y, 9-fluorenone carboxylic acid, 3-butoxy-5,7-diiodo-6-fluorone, 3-hydroxy-2,4,5,7-tetraiodo-6-fluorone, 2-chlorothioxanthone and quercetin. Preferred photoinitiators include safranin-O, acridine orange, bromaminic acid sodium salt, ethyl violet, methyl orange, curcumin, riboflavin, flavin mononucleotide, methylene blue, zinc phthalocyanine, tetraphenylsulfonate porphyrin, quinolone yellow WS, eosin Y, eosin Y disodium salt, erythrosin B, rose bengal, rhodamine B, phloxine B and dibromofluorescein.

The photoinitiator used as component (b) preferably comprises a conjugated system having at least 10 (more preferably at least 12) delocalized (TT) electrons. A conjugated system is a system of connected p-orbitals with delocalized electrons in molecules, generally having alternating single and multiple bonds. The conjugated system may be linear, cyclic (aromatic) or a combination of linear and cyclic (aromatic). Linear conjugated systems usually have a high attenuation coefficient but may have radical scavenging properties which are not desired. Therefore component (b) preferably comprises aromatic groups, optionally also including linear conjugated group(s).

The wavelength at which the photoinitiator has an absorption maximum and its attenuation coefficient are strongly influenced by functional groups present in the photoinitiator, especially if directly attached to an atom that forms a part of a conjugated system. Groups that have a positive effect on the attenuation coefficient are, for example, primary, secondary and tertiary amine groups, hydroxyl groups, ether groups, thioether groups, alkyl groups and carbonyl groups. The photoinitiator preferably comprises one or more of these groups. Halogens do not influence the absorption properties of the photoinitiator significantly but stabilize the excited exited state and thereby enhance the efficiency of the photoinitiator. Therefore the photoinitiator preferably comprises one or more halogen groups (e.g. chloro, iodo and/or bromo groups).

It is desirable for the composition to be in the form of a solution in which all components have good solubility. Thus where the composition comprises a polar solvent (e.g. water), the photoinitiator preferably comprises one or more charged groups as these enhance the solubility in polar solvents such as water. Suitable charged groups include sulfo and carboxyl groups in free acid or salt form and quaternary ammonium groups.

Preferably the photoinitiator is free from groups which have radical scavenging properties (e.g. nitro groups and thiol groups) as such groups may slow or inhibit curing.

Preferably the photoinitiator does not contain two or more hydroxyl groups attached to atoms which form a part of the conjugated system Preferably the photoinitiator has at least two groups selected from chloro, bromo, iodo, primary, secondary or tertiary amino, alkyl, carbonyl, ether, thioether, carboxyl, sulfo and quaternary ammonium groups and is free from nitro, thiol and multiple hydroxyl groups.

For membranes intended for use in food or pharmaceutical applications the photoinitiator(s) used as component (b) is or are preferably known to be harmless and/or are approved for food and/or pharmaceutical use (e.g. by the U.S. Food and Drug Administration (FDA)), e.g. erythrosin B, flavin mononucleotide, curcumin, riboflavin, tartrazine, quinolone yellow, azorubine, amaranth, ponceau 4R, allura red AC, patent blue V, indigo carmine, brilliant blue FCF, chlorophyll derivatives, copper complexes of chlorophyll or chlorophyllin derivatives, carotenoids, sunset yellow FCF, carminic acid, green S, xantophyll derivatives, brilliant black BN, or one or more thereof. Preferably component (b) is 'edible', i.e. is suitable for food and beverages, dietary supplements, drugs and cosmetics, and preferably has a visible colour, i.e. absorbs light in the wavelength range between 400 and 800 nm.

The preferred amount of component (b) present in the composition depends on a number of factors, including the absorption characteristics and molar attenuation coefficient of component (b), its solubility in the rest of the composition and also the degree of overlap between the absorption spectrum of component (b) and the emission spectrum of the radiation source. Preferably, however, the curable composition comprises 0.002 to 4 wt %, more preferably 0.005 to 2 wt %, especially 0.005 to 0.9 wt %, e.g. 0.02 wt %, 0.05 wt %, 0.1 wt %, 0.3 wt % or 0.6 wt % of component (b).

In one embodiment the membrane according to the first and fourth aspect of the present invention and/or the membrane according to the second aspect of the present invention is/are free from component (b) and degradation products thereof. In another embodiment the membrane according to the first and fourth aspect of the present invention and the membrane according to the second aspect of the present invention each independently comprise component (b) and/or degradation products thereof.

Preferably component (b) has a solubility in the rest of the composition of at least 0.05 wt %, more preferably at least 0.1 wt %.

If desired further initiator(s) may be included in the composition, in addition to component (b), e.g. one or more thermal initiators.

Component (b) typically absorbs light at a wavelength longer than 380 nm to generate an excited photoinitiator molecule which extracts an electron, a proton or both from the co-initiator (c) to generate a free radical. The free radical then causes components (a) and (d) (when present) to cure. Thus the co-initiator may be any chemical which can generate a free radical in reaction with component (b) when the latter is in an electronic exited state, e.g. when the composition is irradiated with light matching with the absorption spectrum of component (b) (having an absorption maximum at a wavelength longer than 380 nm).

Preferably component (c) comprises a tertiary amine, an acrylated amine, an onium salt (e.g. a salt of a iodonium, sulfonium, phosphonium or diazonium ion), a triazine derivative, an organohalogen compound, an ether group, a ketone, a thiol, a borate salt, a sulfide (e.g. thioether), a pyridinium salt, a ferrocenium salt, or two or more thereof.

Preferred co-initiators include triethylamine, triethanolamine, methyl diethanol amine, dimethylethanolamine, ethylenediamine-tetra(2-propanol), 1,4-dimethyl piperazine, n-phenyldiethanolamine, 4-(dimethylamino)benzaldehyde, 7-diethylamino-4-methylcoumarin, 2-(diethylamino)ethyl methacrylate, carbon tetrabromide, diphenyliodonium chloride, 2-ethylhexyl-4-dimethylaminobenzoate, 4-(dimethylamino)benzonitrile, ethyl-4-dimethylaminobenzoate, dimethylaminopropylacrylamide, dimethylaminoethyl methacrylate, diphenyliodonium nitrate, N-phenylglycine, 2,4,6-tris(trichloromethyl)-1,3,5-triazine, 2-(4-methoxyphenyl)-4,6-bis(trichloromethyl)-1,3,5-triazine, hexaethylmelamine, hexamethylenetetramine, piperonyl alcohol, N,N-dimethyl-p-toluidine, L-arginine, and mixtures comprising two or more thereof.

Although component (c) may contribute to dissolving the components of the composition, e.g. triethanolamine, for the purpose of this specification component (c) is not regarded as a solvent.

Preferably the composition comprises 0.01 to 40 wt %, more preferably 0.05 to 20 wt %, even more preferably 0.1 to 5 wt %, of component (c).

Preferably the molar ratio of component (b): (c) present in the composition is larger than 1:1, more preferably larger than 1:2, especially larger than 1:5, more especially larger than 1:10.

Optionally the composition further comprises, as component (e), one or more solvents. Component (e) may be any solvent which does not copolymerise with component (a) or (d) (when present) or act as a co-initiator. In an embodiment component (e) preferably comprises water and optionally an organic solvent, especially where some or all of the organic solvent is water-miscible. The water is useful for dissolving component (a) and the organic solvent is useful for dissolving other organic components of the composition.

Component (e) is useful for reducing the viscosity and/or surface tension of the composition, making the manufacturing process for the membrane easier in some respects, particularly when the membrane is required to be in the form of a sheet.

In one embodiment component (e) comprises at least 50 wt % water, more preferably at least 70 wt % water, relative to the total weight of component (e). In one embodiment component (e) comprises less than 30 wt % of organic solvent and any remaining solvent is water. In another embodiment the composition is free from organic solvents, providing environmental advantages due to the complete absence of (volatile) organic solvents. In a specific embodiment water is used as solvent, e.g. water having a pH below 7.

In another embodiment component (e) comprises one or more organic solvents to dissolve the components of the composition and is free from water. This is especially useful when components (a), (b), (c) and (d) (when present) have a low or no solubility in water.

Preferably, in some embodiments, the composition comprises 0 to 60 wt %, more preferably 4 to 50 wt %, most preferably 10 to 45 wt % of component (e). In other embodiments the composition comprises 50 to 95 wt %, preferably 70 to 90 wt % of component (e).

Preferred organic solvents which may be used as or in component (e) include $C_{1-4}$ alcohols (e.g. mono ols such as methanol, ethanol and propan-2-ol); diols (e.g. ethylene glycol and propylene glycol); triols (e.g. glycerol)); carbonates (e.g. ethylene carbonate, propylene carbonate, dimethyl carbonate, diethyl carbonate, di-t-butyl dicarbonate and glycerin carbonate); dimethyl formamide; dimethylsulfoxide, acetone; N-methyl-2-pyrrolidinone; and mixtures comprising two or more of the foregoing.

The organic solvent is inert (i.e. not copolymerisable with component (a) or (d) (when present)).

Component (e) may comprise none, one or more than one organic solvent.

The curable composition may further comprise additives, for example a surfactant, pH regulator, viscosity modifier, structure modifier, stabilizer, polymerization inhibitor or two or more of the foregoing.

A surfactant or combination of surfactants may be included in the composition as, for example, a wetting agent or to adjust surface tension. Commercially available surfactants may be utilized, including radiation-curable surfactants. Surfactants suitable for use in the composition include non-ionic surfactants, ionic surfactants, amphoteric surfactants and combinations thereof.

Preferred surfactants are as described in WO 2007/018425, page 20, line 15 to page 22, line 6, which are incorporated herein by reference thereto. Fluorosurfactants are particularly preferred, especially Zonyl® FSN and Capstone® fluorosurfactants (produced by E. I. Du Pont). Also preferred are polysiloxane based surfactants, especially Surfynol™ from Air Products, Xiameter™ surfactants from DowCorning, TegoPren™ and TegoGlide™ surfactants from Evonik, Siltech™ and Silsurf™ surfactants from Siltech, and Maxx™ organosilicone surfactant from Sumitomo Chemical.

Preferably the composition comprises a polymerization inhibitor (e.g. in an amount of below 2 wt %). This is useful to prevent premature curing of the composition during, for example, storage. Suitable polymerization inhibitors include hydroquinone, hydroquinone mono methyl ether, 2,6-di-t-butyl-4-methylphenol, 4-t-butyl-catechol, phenothiazine, 4-oxo-2,2,6,6-tetramethyl-1-piperidinyloxy, free radical (4-oxo-TEMPO), 4-hydroxy-2,2,6,6-tetramethyl-1-piperidinyloxy, free radical (4-hydroxy-TEMPO), 2,6-dinitro-sec-butylphenol, tris(N-nitroso-N-phenylhydroxylamine) aluminum salt, Omnistab™ IN 510, and mixtures comprising two or more thereof.

Thus in a preferred aspect of the present invention the composition comprises:
  (a) from 2 to 95 wt % of component (a);
  (b) from 0.002 to 4 wt % of component (b), component (b) preferably being Norrish Type II photoinitiator which has an absorption maximum at a wavelength longer than 380 nm, when measured at a temperature of 23° C. in one or more of the following solvents: water, ethanol and toluene;
  (c) from 0.01 to 40 wt % of component (c); and
  (d) from 0 to 50 wt % of component (d).

In an embodiment of this preferred aspect of the present invention the composition further comprises from 0 to 60 wt % of component (e), solvent.

Preferably the membrane is in the form of a sheet, for example the membrane (e.g. a composite ion exchange membrane) comprises a porous support.

Due to the presence of component (b) the porous support may optionally contain aromatic groups. Thus the present invention has the advantage of providing a method for making composite membranes comprising a membrane and an aromatic porous support by a curing process involving light (e.g. UV or visible light curing) which is much faster than thermal curing processes.

As examples of porous supports there may be mentioned woven and non-woven synthetic fabrics and extruded films. Examples include wetlaid and drylaid non-woven material, spunbond and meltblown fabrics and nanofiber webs made from, e.g. polyethylene, polypropylene, polyacrylonitrile, polyvinyl chloride, polyphenylenesulfide, polyester, polyamide, polyaryletherketones such as polyether ether ketone and copolymers thereof. Porous supports may also be porous membranes, e.g. polysulfone, polyethersulfone, polyphenylenesulfone, polyphenylenesulfide, polyimide, polyethermide, polyamide, polyamideimide, polyacrylonitrile, polycarbonate, polyacrylate, cellulose acetate, polypropylene, poly(4-methyl 1-pentene), polyinylidene fluoride, polytetrafluoroethylene, polyhexafluoropropylene and polychlorotrifluoroethylene membranes and derivatives thereof.

The porous support preferably has an average thickness of between 10 and 200 µm, more preferably between 20 and 150 µm.

Preferably the porous support has a porosity of 30 and 95%. The porosity of the support may be determined by a porometer, e.g. a Porolux™ 1000 from IB-FT GmbH, Germany.

The porous support, when present, is optionally a porous support which has been treated to modify its surface energy, e.g. to values above 45 mN/m, preferably above 55 mN/m. Suitable treatments include corona discharge treatment, plasma glow discharge treatment, flame treatment, ultraviolet light irradiation treatment, chemical treatment or the like, e.g. for the purpose of improving the wettability of and the adhesiveness of the membrane to the porous support.

Commercially available porous supports are available from a number of sources, e.g. from Freudenberg Filtration Technologies (Novatexx materials), Lydall Performance Materials, Celgard LLC, APorous Inc., SWM (Conwed Plastics, DelStar Technologies), Teijin, Hirose, Mitsubishi Paper Mills Ltd and Sefar AG.

Preferably the support is a polymeric support.

Aromatic porous supports include porous supports derived from one or more aromatic monomers, for example aromatic polyamide (aramid), (sulfonated) polyphenylenesulfone, poly(phenylene sulfide sulfone), aromatic polyesters (e.g. polyethyleneterephthalate (PET) or polybutyleneterephthalate (PBT)), aromatic polyether ether ketone, polyphenylenesulfide or a combination of two or more of the foregoing. In one embodiment the support strongly absorbs UV light (up to 380 nm). Absorption is regarded as strong as the support has less than 90% transmittance at a wavelength longer than 340 nm as measured in a UV spectrophotometer.

Examples of commercially available aromatic porous supports include Teijin, Hirose, Mitsubishi Paper Mills Ltd and Sefar AG.

The thickness of the membrane according to the second aspect of the present invention, including the porous support (when present), is preferably less than 250 µm, more preferably from 5 to 200 µm, most preferably from 10 to 150 µm, e.g. about 20, about 50, about 75 or about 100 µm.

Preferably the membrane has an ion exchange capacity of at least 0.1 meq/g, more preferably of at least 0.3 meq/g, especially more than 0.6 meq/g, more especially more than 1.0 meq/g, based on the total dry weight of the membrane (including the porous support when present). Ion exchange capacity may be measured by titration as described by Dlugolecki et al, J. of Membrane Science, 319 (2008) on page 217.

Preferably the membrane exhibits a swelling in water of less than 100%, more preferably less than 75%, most preferably less than 60%. The degree of swelling can be controlled by the amount of crosslinking agents, the amount of non-curable compounds and by selecting appropriate parameters in the curing step and further by the properties of the porous support (when present). Electrical resistance, permselectivity and swelling degree in water (aka water uptake) may be measured by the methods described by Dlugolecki et al, J. of Membrane Science, 319 (2008) on pages 217-218.

Typically the membrane is substantially non-porous, e.g. in swollen state not impregnatable by small molecules. The membrane preferably has pores all of which are smaller than the detection limit of a standard Scanning Electron Microscope (SEM). Thus using a Jeol JSM-6335F Field Emission SEM (applying an accelerating voltage of 2 kV, working distance 4 mm, aperture 4, sample coated with Pt with a thickness of 1.5 nm, magnification 100,000×, 3° tilted view) the average pore size is generally smaller than 2 nm, preferably smaller than 1 nm.

The membrane preferably has a low water permeability so that (hydrated) ions may pass through the membrane and (free) water molecules do not easily pass through the membrane.

Preferably the membrane's water permeability is lower than $1.10^{-9}$ m$^3$/m$^2$·s·kPa, more preferably lower than $1.10^{-10}$ m$^3$/m$^2$·s·kPa, most preferably lower than $5.10^{-11}$ m$^3$/m$^2$·s·kPa, especially lower than $3.10^{-11}$ m$^3$/m$^2$·s·kPa.

Preferably the membrane has a permselectivity for small cations (e.g. Na+) or anions (e.g. Cl$^-$) above 90%, more preferably above 95%.

Preferably the membrane has an electrical resistance less than 15 ohm·cm$^2$, more preferably less than 10 ohm·cm$^2$, most preferably less than 8 ohm·cm$^2$. For certain applications a high electrical resistance may be acceptable especially when the permselectivity is very high, e.g. higher than 95%, and the water permeation very low, for example for processes that operate with low conductive streams such as systems used for producing ultrapure water and/or drinking water.

According to a second aspect of the present invention there is provided a process for preparing an ion exchange membrane comprising curing the composition defined in the first aspect of the present invention.

The process of the present invention may contain further steps if desired, for example the steps of applying the composition to a porous support prior to curing, washing and/or drying the cured composition (i.e. the membrane).

Optionally the process comprises the further step of washing out unreacted composition from the ion exchange membrane.

While in an embodiment it is possible to prepare a membrane according to the present invention on a batch basis using a stationary support, it is much preferred to prepare a membrane on a continuous basis using a moving support (especially a moving porous support). The porous support may be in the form of a roll which is unwound continuously, or in the form of a hollow fibre, or the porous support may rest on a carrier, e.g. a continuously driven belt (or a combination of these methods). Using such techniques the composition can be applied to a porous support on a continuous basis or it can be applied to a porous support on a large batch basis.

The curable composition may be applied to a porous support by any suitable method, for example by curtain coating, blade coating, air-knife coating, knife-over-roll coating, slide coating, nip roll coating, forward roll coating, reverse roll coating, micro-roll coating, dip coating, foulard coating, kiss coating, rod bar coating or spray coating. The curable composition typically forms a continuous film layer on the porous support or the carrier or the porous support may be impregnated with the composition. The coating of multiple layers can be done simultaneously or consecutively. When coating multiple layers, the curable compositions may be the same or different.

Thus the process step of applying the composition to a porous support may be performed more than once, either with or without curing being performed between each application of the composition. When the composition is applied to both sides of a porous support the resultant impregnated support may be symmetrical or asymmetrical. Thus the composition applied to one side of a porous support may be the same as or different to the composition applied to the other side of the porous support.

Thus in a preferred process, the composition is applied continuously to a moving support (preferably a porous support), preferably by means of a manufacturing unit comprising one or more composition application station(s), one or more irradiation source(s) for curing the composition, a membrane collecting station and a means for moving the porous support from the composition application station(s) to the irradiation source(s) and to the membrane collecting station.

The composition application station(s) may be located at an upstream position relative to the irradiation source(s) and the irradiation source(s) is/are located at an upstream position relative to the membrane collecting station.

In order to produce a sufficiently flowable composition for application by a high speed coating machine, it is preferred that the composition has a viscosity below 5000 mPa·s when measured at 23° C., more preferably from 1 to 1500 mPa·s when measured at 23° C. Most preferably the viscosity of the composition is from 2 to 500 mPa·s when measured at 23° C.

With suitable coating techniques, the composition may be applied to a moving porous support at a speed of over 1 m/min, e.g. 5 m/min, preferably over 10 m/min, more preferably over 15 m/min, e.g. more than 20 m/min, or even higher speeds, such as 30 m/min, or up to 40 m/min can be reached.

During curing components (a) and (d) (when present) typically polymerise to form the membrane. Preferably the curing occurs sufficiently rapidly to form a membrane within 30 seconds. If desired further curing may be applied subsequently to finish off, although generally this is not necessary.

Preferably curing of the composition begins within 3 minutes, more preferably within 60 seconds, after the composition has been applied to a support.

Preferably the curing is achieved by irradiating the composition for less than 30 seconds, more preferably less than 10 seconds, especially less than 3 seconds, more especially less than 2 seconds. In a continuous process the irradiation occurs continuously and the speed at which the composition moves through the beam of irradiation is mainly what determines the time period of curing. The exposure time is determined by the irradiation time by the concentrated beam; stray 'light' generally is too weak to have a significant effect. Preferably the curing uses white, blue or green light. Suitable wavelengths are longer than 380 nm, provided the wavelength of light matches with the absorbing wavelength of component (b).

Suitable sources of light having a wavelength in the range from 380 to 800 nm include light emitting diodes (e.g. white (450 nm & broad peak at 550 nm that extends up to 750 nm), blue (450 nm), green (530 nm), yellow (590 nm), red (625 nm) or UV-V (385, 395, 405 or 420 nm); gas discharge lamps (mercury (430 & 550 nm), gallium (400 & 410 nm), indium (410 & 450 nm), thallium (530 nm) or hydrogen (490 nm)); sulfur plasma lamps (broad peak in complete visible spectrum with maximum at 500 nm). Suitable light emitting diodes can be obtained from Cree, Osram, Hoenle and Chromasens. Gas discharge lamps can be obtained from Heraus, Hoenle and uv-technik meyer GmbH. Sulfur plasma lamps can be obtained from Plasma-international and PlasmaBright. Preferably the curing uses light from a light emitting diode ("LED").

The energy output of the irradiation source used to cure the composition is preferably from 1 to 1000 W/cm, preferably from 2 to 500 W/cm but may be higher or lower as long as cure can be achieved. The exposure intensity is one of the parameters that can be used to control the extent of curing and thereby influences the final structure of the membrane. Preferably the exposure dose is at least 40 mJ/cm$^2$, more preferably between 40 and 1500 mJ/cm$^2$, most preferably between 70 and 900 mJ/cm$^2$, as measured with a Power Puck II radiometer from Uvitron. A typical example of a light source for curing is a 420 nm monochromatic LED with an output of 25 W/cm as supplied by Hoenle. Alternatives are the 385 nm and the 405 nm LEDs from the same supplier.

To reach the desired exposure dose at high coating speeds, more than one irradiation source may be used, so that the composition is irradiated more than once.

According to a third aspect of the present invention there is provided use of an ion exchange membrane according to the first aspect of the present invention, for treatment of an aqueous stream, for example for water softening, tartaric stabilization of wine, demineralization of whey, for purification of a liquid (e.g. water, a sugar syrup, fruit juice, organic solvents, mineral oils and a solution of metal ions), catalyzing chemical reactions, dehumidification, or for the generation of energy.

Although the membranes according to the present invention are primarily intended for use in water purification (e.g. by electrodeionisation or electrodialysis, including continuous electrodeionisation (CEDI) and electrodialysis reversal (EDR)), they may also be used for other purposes, e.g. capacitive deionisation used in e.g. flow through capacitors (FTC), Donnan or diffusion dialysis (DD) for e.g. fluoride removal or the recovery of acids, dehumidification, pervaporation for dehydration of organic solvents, fuel cells, redox flow batteries (RFB), electrolysis (EL) of water or for chlor-alkali production, and reverse electrodialysis (RED).

The membranes according to the present invention may also be used for other purposes, for example as protective coating (e.g. in printing, stereolithography and 3D printing) as a photocurable adhesive, in dental resins or for filtration purposes.

According to a fourth aspect of the present invention there is provided an electrodialysis or reverse electrodialysis unit, an electrodeionization module, a flow through capacitor, a diffusion dialysis apparatus, a membrane distillation module, an electrolyser, a redox flow battery or an acid-base flow battery, comprising one or more membranes according to the first aspect of the present invention. The electrodeionization module is preferably a continuous electrodeionization module.

Preferably the electrodialysis or reverse electrodialysis unit or the electrodeionization module or the flow through capacitor comprises at least one anode, at least one cathode and two or more membranes according to the first aspect of the present invention.

In a preferred embodiment the unit comprises at least 1, more preferably at least 5, e.g. 36, 64, 200, 600 or up to 1500, membrane pairs according to the first aspect of the present invention, the number of membranes being dependent on the application. The membrane may for instance be used in a plate-and-frame or stacked-disk configuration or in a spiral-wound design.

The present invention offers a number of advantages:
(i) The use of component (b) having the specified absorption properties allows the components (a) and (d) to contain aromatic groups that absorb light in the wavelength range 200 to 380 nm. Thus not only aromatic monomers or oligomers can be used to make the ion exchange membranes of the present invention; also porous supports made from aromatic polymers can be used.
(ii) When component (b) is safely edible one may make membranes suitable for food and/or pharmaceutical uses.
(iii) When component (b) has a colour which is visible to the human eye, the resulting membranes are coloured: they absorb light in the wavelength range between 400 and 800 nm. By using a different component (b) for each membrane type (e.g. different membrane types such as anion exchange membrane, cation exchange membrane, monovalent anion exchange membrane, monovalent cation exchange membrane etc.), or the same component (b) in different amounts, each membrane type can be provided with a unique colour or depth of shade, thereby making it easier to assemble a stack of membranes and reducing the chances of making a stack in which the ion exchange membranes are in the wrong order.
(iv) The composition may be cured using visible light, e.g. LED light. Curing with visible light has many advantages compared to UV light (lower energy consumption, no harmful UV irradiation, no or much less useless IR irradiation and thus less heating of the product, no formation of ozone in the irradiation zone, a longer lifetime of the irradiation source and a higher spectral match that could reach 100% when monochromatic light is used). Thus LED light may be much more efficient than use of UV light.
(v) An ideal illumination source from a large number of possible sources can be selected for each photoinitiator system in order to maximize the spectral match between the emission spectrum of the light source and the absorption spectrum of the photoinitiator.
(vi) The curable composition may be handled under yellow or red light conditions, depending on the chosen photoinitiator.
(vii) Curing of the composition to form the membrane is inhibited less by the presence of oxygen than prior art processes which cure using Type I photoinitiators and UV light.
(viii) One may use lower amounts of photoinitiator than prior art processes due to the higher efficiency of the photoinitiator system.

The present invention also provides the use of the membranes according to the first aspect of the present invention to prepare a membrane stack. An exemplary stack comprises alternate anionic membranes and cationic membranes and the anionic membranes each have the same colour or depth of shade as each other and a different colour and/or depth of shade than the cationic membranes. The anionic and cation membranes are preferably as defined in the second aspect of the present invention. Thus the invention provides a stack of ion exchange membrane comprising alternate anionic membranes and cationic membranes wherein the anionic membranes each have the same colour or depth of shade as each other and a different colour and/or depth of shade than the cationic membranes. When also monovalent selective membranes are used they can be given a different colour than the standard membranes by selecting a different component (b) or a different amount of component (b). Therefore the stack preferably comprises AEMs and CEMs obtained from the compositions as described above in relation to the first aspect of the present invention which comprise a sufficient amount of component (b) to provide a visible difference between the AEMs and the CEMs of the stack. Preferably the stack comprises AEMs and CEMs obtained from the compositions as described above in relation to the first aspect of the present invention which comprise at least 0.0005 wt %, more preferably at least 0.001 wt % and especially at least 0.01 wt %, of component (b). Preferably the stack comprises AEMs and CEMs obtained from the compositions as described above in relation to the first aspect of the present invention which comprise less than 4 wt %, more preferably less than 0.5 wt %, especially less than 0.2 wt %, of component (b).

As component (b) may remain in the membrane after curing, the present invention further provides an ion exchange membrane comprising at least 0.0005 wt %, more preferably at least 0.001 wt % and especially at least 0.01 wt %, of component (b). Preferably such ion exchange membranes less than 4 wt %, more preferably less than 0.5 wt %, especially less than 0.2 wt %, of component (b). Component (b) is as defined above in relation to the first aspect of the present invention. Adding dyes or pigments to a prior art composition applying Type I photoinitiators is often not possible since these compounds interfere with the curing process due to their high absorption in the UV region.

The invention will now be illustrated with non-limiting Examples where all parts and percentages are by weight unless specified otherwise.

MATERIALS USED IN THE EXAMPLES

Na-AMPS is sodium salt of 2-acryloylamido-2-methylpropanesulfonic acid from Sigma-Aldrich.
DMAPAA-Q is 3-acrylamidopropyl-trimethylammonium chloride from Kohjin.
LiP is lithium p-styrenesulfonate, a monomer from Tosoh Corp.
VBTMAC is 4-vinylbenzyl trimethyl ammonium chloride from Sigma-Aldrich
TEOA is triethanolamine a co-initiator from Sigma-Aldrich.
IO is diphenyliodonium chloride, a co-initiator from TCI Co.
Darocur™ 1173 is a Type I photoinitiator from BASF.
2223-10 is Viledon® Novatexx 2223-10 (a non-woven, polypropylene/polyethylene porous support from Freudenberg Filtration Technologies and free from aromatic groups).
EtSS Ethyl styrene sulfonate (ethyl ester of styrene sulfonate, supplied by TOSOH).
CL-3 is N,N-(1,4-phenylenebis(methylene))bis(3-acrylamido N,N-dimethylpropan-1-aminium) bromide, a cationically charged crosslinking agent as described in WO2013011273.
AXL-1 has the following structure:
Preparation Method of AXL-1
N,N-dimethyl-N-4-vinylbenzylamine (16.1 g) and 4-vinylbenzyl chloride (15.3 g) were dissolved in isopropylalcohol (100 m¹). 4-OH-TEMPO (0.1 g) was added and the mixture was heated to 60° C. and maintained at this temperature while stirring for 16 hours. The compound AXL-1 was precipitated from the mixture by adding methylethylketone (10 m¹ for every 1 m¹ of reaction mixture). The product, AXL-1, was filtered off and dried in a vacuum oven (25 g).

Riboflavin, Resazurin, Rhodamine B, Quinoline Yellow WS, Neutral Red and Curcumin are Type II photoinitiators from TCI Co and have an absorption maximum at a wavelength longer than 380 nm, when measured in one or more of the following solvents at a temperature of 23° C.: water, ethanol and toluene.

Erythrosin B, Eosin Y disodium salt, Flavin mononucleotide, lumichrome, zinc phtalocyanine, rose Bengal, methylene blue, acridine, safranin-O, 1-amino-anthraquinone, carminic acid, thio michler's ketone, martius yellow, ethyl violet, camphorquinone, Quinaldine red and fluorescein sodium salt are Type II photoinitiators from Sigma-Aldrich and have an absorption maximum at a wavelength longer than 380 nm, when measured in one or more of the following solvents at a temperature of 23° C.: water, ethanol and toluene.

1,4-Anthraquinone, benzophenone, michler's ketone, anthraquinone 2-sulfonate, isopropylthioxanthone (ITX) are optically active reference molecules from Sigma-Aldrich that do not have an absorption maximum at a wavelength longer than 380 nm, when measured in one or more of the following solvents at a temperature of 23° C.: water, ethanol and toluene (i.e. used in Comparative Examples).

An overview of the properties of several photoinitiators is given in Table 1.

TABLE 1

Properties of photoinitiators

| Photoinitiator | Abs. max. (nm) | Solvent | Molar attenuation coefficient ($M^{-1}cm^{-1}$) | Number of conjugated π electrons | Falls within definition of component (b)? |
| --- | --- | --- | --- | --- | --- |
| Erythrosin B | 530 | ethanol | 84500 | 20 | Yes |
| Eosin Y disodium salt | 525 | water | 112000 | 20 | Yes |
| Flavin mononucleotide | 445 | water | 12200 | 12 | Yes |
| Lumichrome | 392 | Water | 11000 | 12 | Yes |
| Zinc Phtalocyanine | 705 | toluene | 281800 | 36 | Yes |
| Rose Bengal | 560 | ethanol | 90400 | 20 | Yes |
| Methylene Blue | 654 | ethanol | 40700 | 14 | Yes |
| Acridine | 392 | ethanol | 13800 | 14 | Yes |
| Safranin-O | 519 | water | 101000 | 20 | Yes |
| 1,4-Anthraquinone | 299 | ethanol | 9300 | 16 | No |
| 1-Amino-anthraquinone | 460 | ethanol | 7000 | 16 | Yes |
| Carminic acid | 494 | water | 10000 | 16 | Yes |
| Benzophenone | 248 | ethanol | 19400 | 14 | No |
| Michler's ketone | 365 | ethanol | 39800 | 14 | No |
| Thio Michler's ketone | 460 | ethanol | 25000 | 14 | Yes |
| Anthraquinone 2-sulfonate | 292 | water |  | 16 | No |
| Martius yellow | 430 | ethanol | 8000 | 10 | Yes |
| Ethyl violet | 490 | water | 93500 | 18 | Yes |
| Riboflavin | 445 | ethanol | 13200 | 12 | Yes |
| Resazurin | 600 | Water | 20600 | 14 | Yes |
| Rhodamine B | 540 | Ethanol | 106000 | 20 | Yes |
| Neutral Red | 560 | Ethanol | 15500 | 14 | Yes |
| Quinaldine Red | 528 | Water | 108000 | 18 | Yes |
| Fluorescein sodium salt | 480 | water | 92300 | 20 | Yes |
| Quinoline yellow WS | 412 | Water | 22700 | 20 | Yes |
| Curcumin | 420 | Ethanol | 55000 | 20 | Yes |
| Darocur ™ 1173 | 243 | ethanol |  | 6 | No |
| Isopropyl Thioxanthone | 365 | Toluene | 6500 | 12 | No |
| Camphorquinone | 460 | Ethanol | 50 | 4 | Yes |

In Table 1 Abs. max. (nm) means absorption maximum in nm when measured in the solvent specified in the third column at a temperature of 23° C.

The absorption maxima quoted in Table 1 were measured using a Varian Cary 100 conc. double beam UV/Vis spectrophotometer. The measurements were carried out with a 0.01 wt % concentration of the photoinitiator in a solvent (pure water, ethanol or toluene) using a 1 mm path length quartz cuvette at 23° C. The absorption spectrum was measured from 800 to 200 nm.

The curing rate of compositions including the photoinitiators was tested in a Mettler Toledo DSC822e Differential Scanning calorimeter (DSC) equipped with a Sylvania ES50 V4 620 LM DIM 865 36° SL lamp.

Preparation of Membrane Examples 1 to 17 and 22 to 26 and Comparative Membrane Examples CEX1 to CEX4

The compositions described in Table 2 below were prepared by dissolving the ingredients specified in pure water (the water makes up the amount to 100 wt %). In the final column of Table 2 "A" means an anionic exchange membrane (CEM) and "C" means a cationic exchange membrane (AEM). "N" means a non-ionic membrane.

In Table 2 "Time (sec.)" means the time in seconds required for the composition to become 90% cured. The point at which the composition was 90% cured was determined by the DSC method described above.

Procedure: 20 mg of each composition under test was placed in a DSC pan at 25° C. and irradiated for 10 minutes from 1 cm distance using a Sylvania ES50 V4 620 LM DIM 865 36° SL lamp. The curing was followed by measuring the heat of the reaction formed against a reference DSC pan containing 20 mg of the same photoinitiator as that used in the composition under test in the same solvent. The composition under test was deemed to be acceptable if the cure time in seconds (i.e. the time in seconds required for the composition to become 90% cured) was less than 300 seconds. Preferably, the cure time was lower than 150 seconds. Results are given in Table 2.

Preparation of Membrane Examples 18 to 21

The compositions described in Table 2 below were prepared by dissolving the photoinitiator and component (c) in the specified component(s) (a) (this makes up the amount to 100 wt %). The resultant composition was than analyzed as described above to determine the time in seconds required for the composition to become 90% cured and the results are shown in Table 2 below.

TABLE 2

Preparation of Membranes

| Example | Composition | | | Cure | |
|---|---|---|---|---|---|
| | Component (a) (wt %) | Photointiator (wt %) | Component (c) (wt %) | Time (sec) | Type of membrane |
| CEX1 | DMAPAA-Q (50) | Anthraquinone 2-sulfonate (0.25) (Comparative) | TEOA (1.0) | >600 | C |
| CEX2 | Na-AMPS (50) | Michlers' ketone (0.10) (Comparative) | TEOA + IO (1.0 + 0.1) | >600 | A |
| CEX3 | LiP (50) | Darocur ™ 1173 (0.50) (Comparative) | — | >600 | A |
| CEX4 | VBTMAC (50) | Anthraquinone 2-sulfonate (0.50) (Comparative) | TEOA + IO (1.0 + 0.1) | >600 | C |
| 1 | LiP (50) | Methylene Blue (0.20) | TEOA + IO (4.0 + 0.2) | 120 | A |
| 2 | LiP (50) | Rose Bengal (0.20) | TEOA + IO (3.0 + 0.2) | 100 | A |
| 3 | LiP (50) | Flavin mononucleotide (0.50) | TEOA + IO (4.0 + 0.2) | 150 | A |
| 4 | LiP (50) | Fluorescein sodium salt (0.20) | TEOA + IO (4.0 + 0.5) | 80 | A |
| 5 | LiP (50) | Eosin Y disodium salt (0.20) | TEOA + IO (4.0 + 0.2) | 100 | A |
| 6 | LiP (50) | Eosin Y disodium salt (0.05) | TEOA + IO (4.0 + 0.2) | 150 | A |
| 7 | LiP (50) | Eosin Y disodium salt (0.50) | TEOA + IO (4.0 + 0.2) | 150 | A |
| 8 | LiP (50) | Eosin Y disodium salt (1.0) | TEOA + IO (4.0 + 0.2) | 250 | A |
| 9 | VBTMAC (50) | Methylene Blue (0.20) | TEOA + IO (4.0 + 0.2) | 120 | C |
| 10 | VBTMAC (50) | Rose Bengal (0.20) | TEOA + IO (3.0 + 0.2) | 100 | C |
| 11 | VBTMAC (50) | Flavin mononucleotide (0.50) | TEOA + IO (4.0 + 0.2) | 100 | C |
| 12 | VBTMAC (50) | Fluorescein sodium salt (0.20) | TEOA + IO (4.0 + 0.5) | 70 | C |
| 13 | VBTMAC (50) | Eosin Y disodium salt (0.20) | TEOA + IO (4.0 + 0.2) | 80 | C |
| 14 | VBTMAC (50) | Eosin Y disodium salt (0.05) | TEOA + IO (4.0 + 0.2) | 120 | C |
| 15 | VBTMAC (50) | Eosin Y disodium salt (0.50) | TEOA + IO (4.0 + 0.2) | 120 | C |
| 16 | VBTMAC (50) | Eosin Y disodium salt (1.0) | TEOA + IO (4.0 + 0.2) | 200 | C |
| 17 | AXL-1 (50) | Eosin Y disodium salt (0.20) | TEOA + IO (4.0 + 0.2) | 100 | C |
| 18 | n-phenyl acrylamide (95.6) | Eosin Y disodium salt (0.20) | TEOA + IO (4.0 + 0.2) | 55 | N |
| 19 | 4-vinyl pyridine (95.6) | Eosin Y disodium salt (0.20) | TEOA + IO (4.0 + 0.2) | 120 | N |
| 20 | 5-vinyl 4-methyl thiazole (95.6) | Eosin Y disodium salt (0.20) | TEOA + IO (4.0 + 0.2) | 125 | N |
| 21 | EtSS (95.6) | Erythrosin B (0.20) | TEOA + IO (4.0 + 0.2) | 200 | N |
| 22 | DMAPAA-Q (15) + CL-3 (45) | Erythrosin B (0.025) | TEOA + IO (0.5 + 0.25) | 60 | A |
| 23 | DMAPAA-Q (15) + CL-3 (45) | Erythrosin B (0.1) | TEOA + IO (0.5 + 0.25) | 40 | A |
| 24 | DMAPAA-Q (15) + CL-3 (45) | Erythrosin B (0.5) | TEOA + IO (0.5 + 0.25) | 60 | A |
| 25 | DMAPAA-Q (15) + CL-3 (45) | Flavin mononucleotide (0.1) | TEOA + IO (0.5 + 0.25) | 60 | A |
| 26 | DMAPAA-Q (15) + CL-3 (45) | Flavin mononucleotide (0.5) | TEOA + IO (0.5 + 0.25) | 80 | A |

Examples 18 to 21 which comprise non-ionic monomers show that the membranes of the present invention may be obtained from compositions comprising non-ionic monomers in addition to ionically charged monomers.

The results in Table 2 above show that the Examples according to the present invention perform better than the Comparative Examples obtained from compositions falling outside of the present claims.

For a few examples from Table 2 the attenuation coefficients of compositions were determined with and without photoinitiator. A ratio (A1/A2)>1.5 is preferred. The results are shown in Table 3 below.

A1 is the attenuation coefficient of the composition at wavelength X nm;

A2 is the attenuation coefficient at wavelength X nm of a composition identical to the composition except that component (b) is omitted; and X nm is the wavelength of the absorption maximum of component (b);

TABLE 3

| | | | A1/A2 | | | |
|---|---|---|---|---|---|---|
| Example | Component (a) (wt %) | Photoinitiator (wt %) | A1 (/cm) | A2 (/cm) | Wavelength X (nm) | A1/A2 |
| CEX3 | LiP (50) | Darocur ™ 1173 (0.50) | 42850 | 42500 | 240 | 1.01 |
| 4 | LiP (50) | Fluorescein sodium salt (0.20) | 491 | 2 | 480 | 246 |
| 5 | LiP (50) | Eosin Y disodium salt (0.20) | 325 | 0.5 | 525 | 650 |
| 11 | VBTMAC (50) | Flavin mononucleotide (0.50) | 134 | 1 | 445 | 134 |

Anion exchange membranes (AEMs) were prepared using the compositions described in Table 4.

TABLE 4

| Component (type) | Ex. 22 (wt %) | Ex. 23 (wt %) | Ex. 24 (wt %) | Ex. 25 (wt %) | Ex. 26 (wt %) |
|---|---|---|---|---|---|
| DMAPAA-Q (a) | 15.0 | 15.0 | 15.0 | 15.0 | 15.0 |
| CL-3 (a) | 45.0 | 45.0 | 45.0 | 45.0 | 45.0 |
| Erythrosin B (b) | 0.025 | 0.1 | 0.5 | | |
| Flavin mononucleotide (b) | | | | 0.1 | 0.5 |
| IO (c) | 0.25 | 0.25 | 0.25 | 0.25 | 0.25 |
| TEOA (c) | 0.5 | 0.5 | 0.5 | 0.5 | 0.5 |
| Water (e) | 39.225 | 39.15 | 38.75 | 39.15 | 38.75 |

The compositions described in Table 4 were applied to a PET sheet using a 100 μm Meyer bar. A porous support (2223-10) was placed in the layer of composition and any excess composition was scraped-off. The composition present in the porous support was then cured by placing it on a conveyer belt set at 5 m/min, equipped with a Heraeus F450 microwave-powered UV-curing system with a medium-pressure mercury bulb (240 W/cm, 100%) to give the AEMs.

The presence of photoinitiator in the membrane may be determined visibly, photospectrometrically or analytically.

The amounts of photoinitiator were determined analytically by extraction (in duplo). The analysis was performed by cutting 10×10 cm pieces of the AEMs into small rectangles that were placed in a 20 m$^1$ glass container to which 5 m$^1$ of pure water was added. The glass containers were capped and packed in aluminum foil to protect them from light. The glass containers were shaken at 125 RPM on the rotary shaker for 24 hours. Thereafter, the content of the glass containers were filtered through a 0.45 μm cellulose filter and transferred to a HPLC vial.

Analysis Method HPLC

| | |
|---|---|
| Instrument: | Waters ACQUITY arc HPLC |
| Detector: | 2998 ACQ-PDA |
| Column: | TKSgelODA-100V HPLC column (4.6 × 150, 5 μm) |
| Maximum pressure: | 450 [bar] |
| Column Temperature: | 40 [° C.] |
| Sample Temperature: | 5 [° C.] |
| Absorbance, resolution: | 254, 270, 280, 440, 540, 485 (4.8) [nm] |
| 254 nm = identification Riboflavin monophosphate | |
| 485 nm = identification of erythrosine B | |
| Injection volume: | 100 [microliter] |
| Run Time: | 24 [min] |
| Next inj. Delay: | 0 [min] |
| Installed sample loop: | 250 [microliter] |
| Solvents: | A: acetonitrile + 0.1% trifluoroacetic acid |
| | B: pure water + 0.1% trifluoroacetic acid |

Gradient:

| Time [min] | Flow [ml/min] | A [%] | B [%] |
|---|---|---|---|
| Initial | 0.5 | 5 | 95 |
| 1 | 0.5 | 5 | 95 |
| 3 | 0.5 | 40 | 60 |
| 5 | 0.5 | 40 | 60 |
| 6 | 0.5 | 80 | 20 |
| 7 | 0.5 | 80 | 20 |
| 8 | 0.5 | 100 | 0 |
| 11 | 0.5 | 100 | 0 |
| 20 | 0.5 | 100 | 0 |
| 20.1 | 0.5 | 5 | 95 |
| 24 | 0.5 | 5 | 95 |

| Extracted amounts | Ex. 22 (wt %) | Ex. 23 (wt %) | Ex. 24 (wt %) | Ex. 25 (wt %) | Ex. 26 (wt %) |
|---|---|---|---|---|---|
| Erythrosin B (b) | 0.002 | 0.012 | 0.050 | | |
| Flavin mononucleotide (b) | | | | 0.020 | 0.080 |

What is claimed is:

1. An ion exchange membrane obtained by curing a composition comprising:
   (a) a monomer comprising an aromatic group and at least one polymerisable ethylenically unsaturated group;
   (b) a photoinitiator having a visible color and which has an absorption maximum between 400 and 800 nm when measured in one or more of the following solvents at a temperature of 23° C.: water, ethanol and toluene and which has a molar attenuation coefficient at the absorption maximum of at least 7,500 $M^{-1}$ $cm^{-1}$; and
   (c) at least one co-initiator.

2. The ion exchange membrane according to claim 1 wherein component (a) comprises a vinylphenyl group, a vinylpyridyl group, a vinylimidazyl group, a vinylthiazinyl group, a vinyltriazinyl group, a vinylpyrryl group or a vinylpyrimidyl group.

3. The ion exchange membrane according to claim 1 wherein the at least one polymerisable ethylenically unsaturated group is a (meth)acrylic group.

4. The ion exchange membrane according to claim 1 which further comprises (d) a curable monomer which is free from aromatic groups.

5. The ion exchange membrane according to claim 4 wherein component (d) comprises at least one group selected from anionic groups and cationic groups.

6. The ion exchange membrane according to claim 1 wherein the said photoinitiator is a Norrish Type II photoinitiator.

7. The ion exchange membrane according to claim 1 wherein the composition further comprises: (e) solvent.

8. The ion exchange membrane according to claim 1 wherein the co-initiator is a chemical which can generate a free radical in reaction with component (b) when the latter is in an electronic excited state.

9. The ion exchange membrane according to claim 1 wherein the composition satisfies Equation 1:

$$(A1/A2) > 1.5 \qquad \text{Equation 1}$$

wherein:
A1 is the attenuation coefficient of the composition at wavelength X nm;
A2 is the attenuation coefficient at wavelength X nm of a composition identical to the composition except that component (b) is omitted; and
X nm is the wavelength of the absorption maximum of component (b);
wherein the attenuation coefficients are all measured at a temperature of 23° C.

10. The ion exchange membrane according to claim 1 wherein component (c) comprises a tertiary amine, an acrylated amine, an onium salt, a triazine derivative, an organohalogen compound, an ether group, a ketone, a thiol, a borate salt, a sulfide, a pyridinium salt, a ferrocenium salt, or two or more thereof.

11. The ion exchange membrane according to claim 10 wherein the onium salt comprises a salt of an iodonium, sulfonium, phosphonium or diazonium ion.

12. The ion exchange membrane according to claim 1 wherein component (b) comprises a xanthene, flavin, curcumin, porphyrin, anthraquinone, phenoxazine, phenazine, acridine, phenothiazine, xanthone, thioxanthone, thioxanthene, acridine, acridone, flavone, coumarin, fluorenone, quinolone, naphthaquinone, quinolinone, arylmethane, azo, benzophenone, carotenoid, cyanine, phthalocyanine, dipyrrin, squarine, stilbene, styryl, triazine or anthocyanin photoinitiator, in each case having an absorption maximum at a wavelength longer than 380 nm, when measured at a temperature of 23° C. in a solvent selected from water, ethanol and toluene.

13. The ion exchange membrane according to claim 1 wherein the composition comprises:
   (a) from 2 to 95 wt % of component (a);
   (b) from 0.002 to 4 wt % of component (b);
   (c) from 0.01 to 40 wt % of component (c); and
   (d) from 0 to 50 wt % of a curable monomer which is free from aromatic groups (component (d)).

14. The ion exchange membrane according to claim 13 wherein the composition further comprises 4 to 50 wt % of (e) solvent.

15. The ion exchange membrane according to claim 14 wherein component (e) comprises at least 50 wt % water.

16. The ion exchange membrane according to claim 1 which further comprises a porous support.

17. An ion exchange membrane comprising at least 0.0005 wt % of a photoinitiator having a visible color and which has an absorption maximum at a wavelength between 400 and 800 nm when measured in one or more of the following solvents at a temperature of 23° C.: water, ethanol and toluene, and which has a molar attenuation coefficient at the absorption maximum of at least 7,500 $M^{-1}$ $cm^{-1}$.

18. A process for preparing an ion exchange membrane comprising curing the composition defined in claim 1.

19. The process according to claim 18 wherein the composition is cured using light having a peak irradiance at a wavelength longer than 380 nm using a dose of at least 40 $mJ/cm^2$.

20. The process according to claim 18 which comprises the step of applying the composition to a porous support prior to curing.

21. The process according to claim 18 which further comprises the step of washing and/or drying the cured composition.

22. A method of using an ion exchange membrane according to claim 1 for treatment of aqueous streams, for purification of organic solvents, mineral oils, and metals, for catalyzing chemical reactions, or for the generation of energy.

23. A stack comprising ion exchange membranes according to claim 1 comprising alternate anionic membranes and cationic membranes wherein the anionic membranes each have the same colour and/or depth of shade as each other and a different colour and/or depth of shade from the cationic membranes.

24. An electrodialysis or reverse electrodialysis unit, an electrodeionization module, a flow through capacitor, a diffusion dialysis apparatus, a membrane distillation module, an electrolyser, a redox flow battery or an acid-base flow battery, comprising one or more ion exchange membranes according to claim 1.

25. The ion exchange membrane according to claim 1 wherein said photoinitiator comprises a conjugated system having at least 10 delocalized electrons.

* * * * *